(12) United States Patent
Bucknell

(10) Patent No.: US 8,266,781 B2
(45) Date of Patent: Sep. 18, 2012

(54) HYDRAULIC TENSIONING JACKS

(75) Inventor: John Wentworth Bucknell, Indooroopilly (AU)

(73) Assignee: John Wentworth Bucknell (AU)

( * ) Notice: Subject to any disclaimer, the term of this patent is extended or adjusted under 35 U.S.C. 154(b) by 974 days.

(21) Appl. No.: 11/570,719

(22) PCT Filed: Jun. 17, 2005

(86) PCT No.: PCT/AU2005/000877
§ 371 (c)(1),
(2), (4) Date: Aug. 20, 2008

(87) PCT Pub. No.: WO2005/123345
PCT Pub. Date: Dec. 29, 2005

(65) Prior Publication Data
US 2008/0301926 A1 Dec. 11, 2008

(30) Foreign Application Priority Data

Jun. 17, 2004 (AU) ................................ 2004903276

(51) Int. Cl.
*B21D 39/00* (2006.01)
*F16B 31/00* (2006.01)
(52) U.S. Cl. ............ 29/452; 29/456; 29/446; 29/525.02; 411/14.5; 411/916; 411/917; 411/538; 411/546
(58) Field of Classification Search ............ 29/446, 29/452, 456, 525.02; 411/14.5, 546, 916, 411/917, 535, 536, 537, 538; 81/57.38; 254/29 A
See application file for complete search history.

(56) References Cited

U.S. PATENT DOCUMENTS

| 2,571,265 | A | * | 10/1951 | Gustav | 411/434 |
| 2,736,219 | A | * | 2/1956 | May | 81/467 |
| 2,760,393 | A | * | 8/1956 | Stough | 81/57.38 |
| 2,783,024 | A | * | 2/1957 | Lee | 254/29 A |
| 3,285,568 | A | * | 11/1966 | Biach | 254/29 A |
| 3,707,107 | A | * | 12/1972 | Bieri | 411/423 |
| 4,010,669 | A | * | 3/1977 | Kloren | 411/544 |
| 4,012,826 | A | * | 3/1977 | Stansfield | 29/446 |
| 4,075,923 | A | * | 2/1978 | Latham | 411/378 |
| 4,854,798 | A | * | 8/1989 | Snyder et al. | 411/434 |
| 5,253,967 | A | * | 10/1993 | Orban et al. | 411/432 |
| 5,466,107 | A | * | 11/1995 | Percival-Smith | 411/546 |
| 5,468,106 | A | * | 11/1995 | Percival-Smith | 411/434 |
| 6,840,726 | B2 | * | 1/2005 | Gosling | 411/14.5 |
| 7,066,699 | B2 | * | 6/2006 | Gosling | 411/14.5 |

(Continued)

FOREIGN PATENT DOCUMENTS
DE 2356604 A 5/1975
(Continued)

*Primary Examiner* — Essama Omgba
(74) *Attorney, Agent, or Firm* — Krugliak, Wilkins, Griffiths & Dougherty Co., L.P.A.; David P. Dureska; Brent L. Moore

(57) ABSTRACT

Axially expandable spacers (51, 53) are insertable between a nut (20), on a bolt (19) to be tensioned, and a face (F) on a component (C) and have ramp faces (52, 54) to take up the space as the bolt (19) is tensioned by an hydraulic tensioner (25), where the puller bar (35) is engaged with an extension (121) on the nut (120). A segmented collar (60) has radially movable segments (61) to allow quick engagement/release between the puller bar (35) and the end of the bolt (19) on the nut (120).

6 Claims, 19 Drawing Sheets

U.S. PATENT DOCUMENTS

| | | | | |
|---|---|---|---|---|
| 7,140,824 B2 * | 11/2006 | Bucknell | | 411/14.5 |
| 2004/0115023 A1 * | 6/2004 | Gosling | | 411/14.5 |
| 2004/0115024 A1 * | 6/2004 | Gosling | | 411/14.5 |
| 2004/0165963 A1 * | 8/2004 | Bucknell | | 411/14.5 |
| 2011/0188960 A1 * | 8/2011 | Hohmann et al. | | 411/14.5 |

FOREIGN PATENT DOCUMENTS

| | | |
|---|---|---|
| GB | 1390012 A | 4/1975 |
| GB | 2092254 A | 8/1982 |
| JP | 52040262 A * | 3/1977 |

* cited by examiner

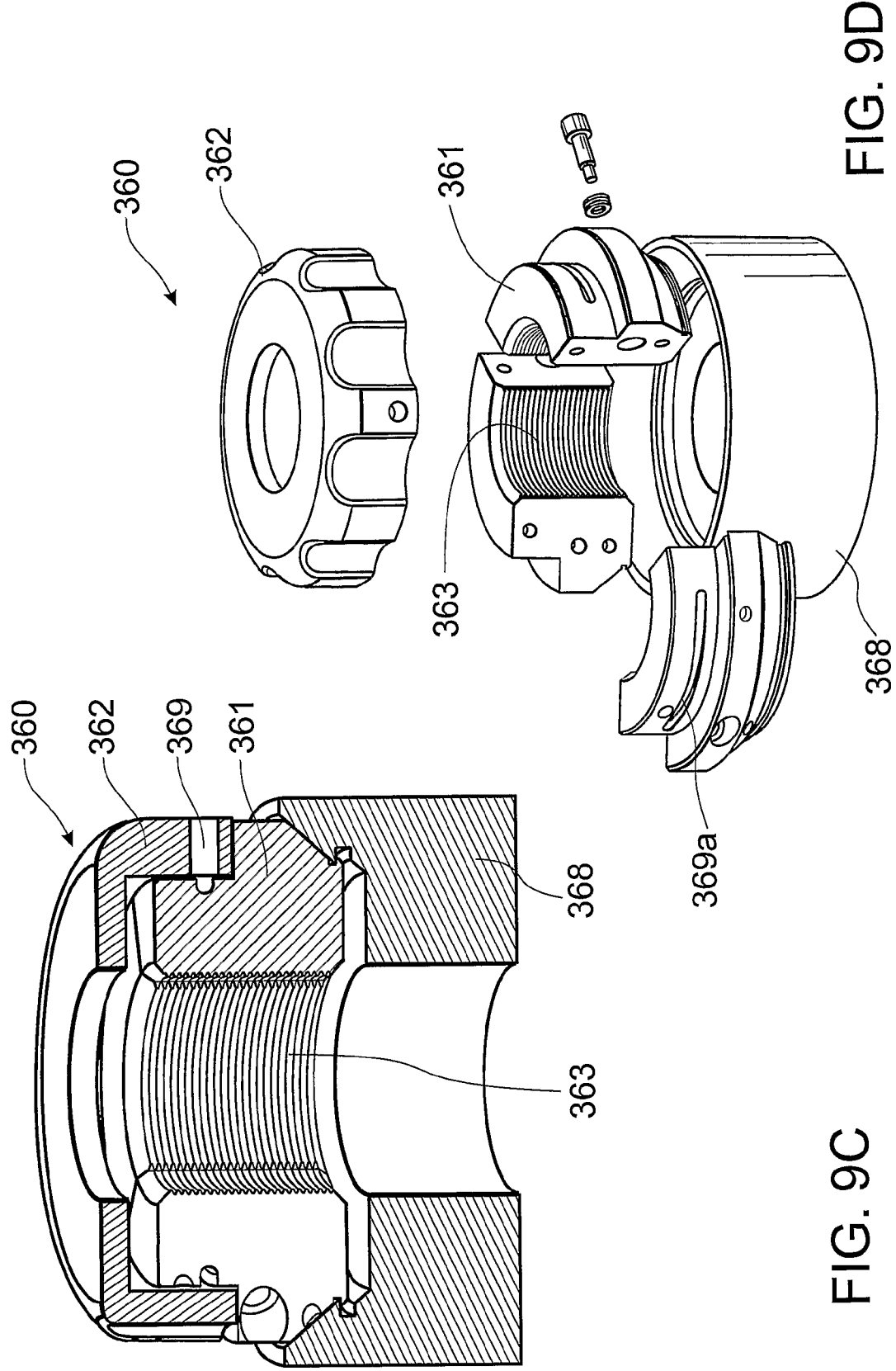

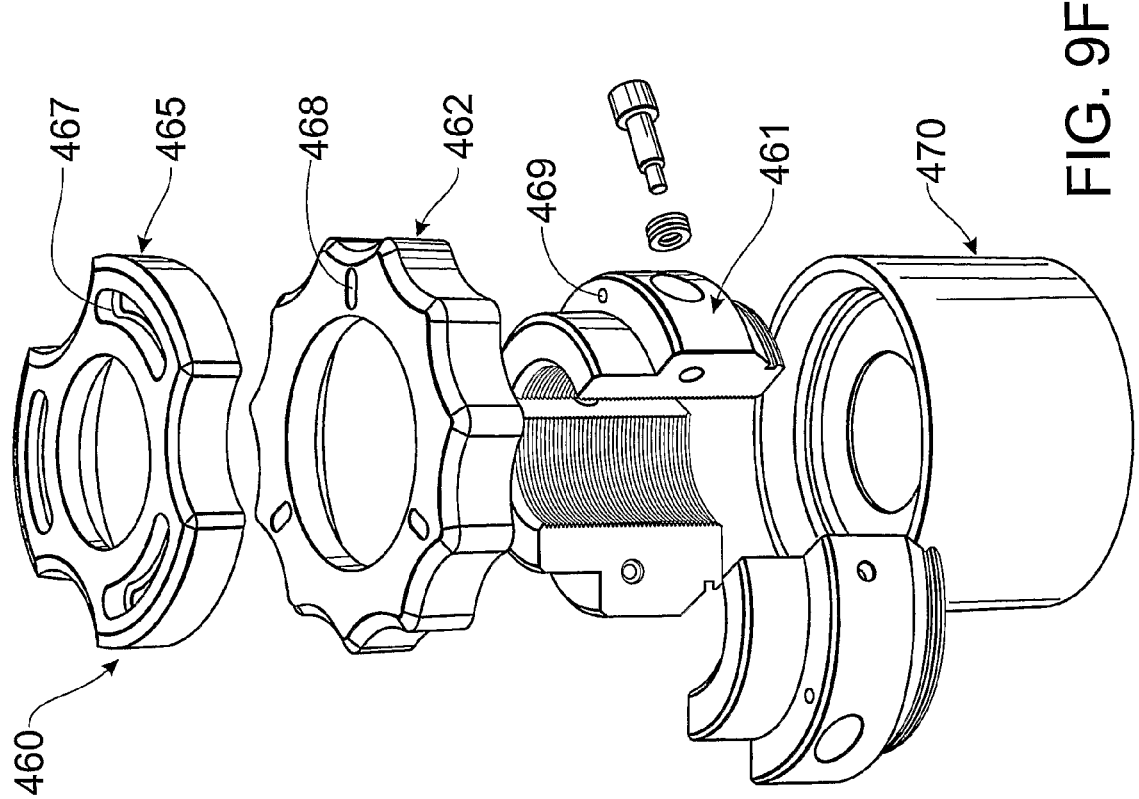
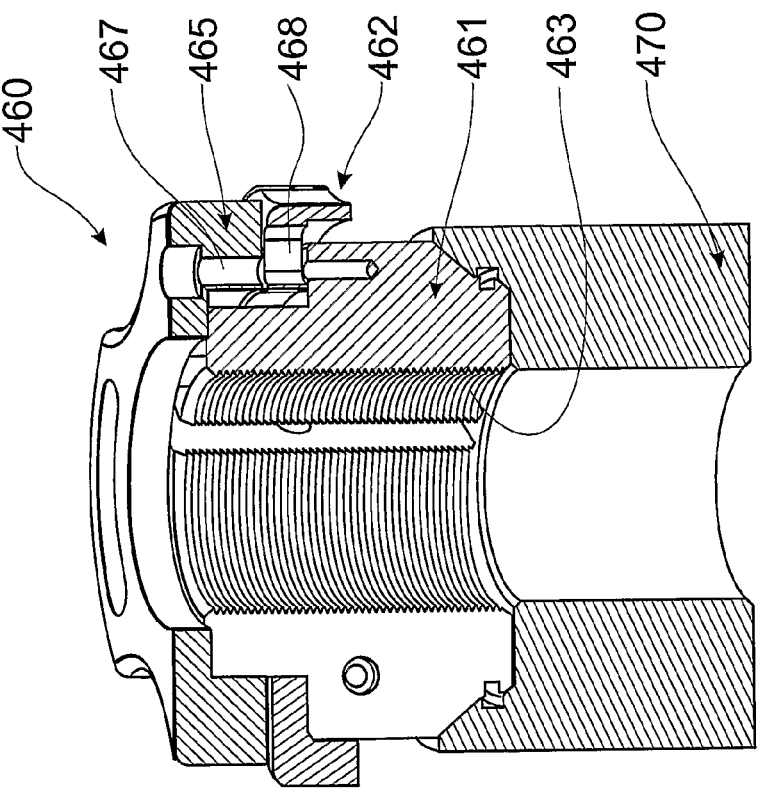
FIG. 9F
FIG. 9E

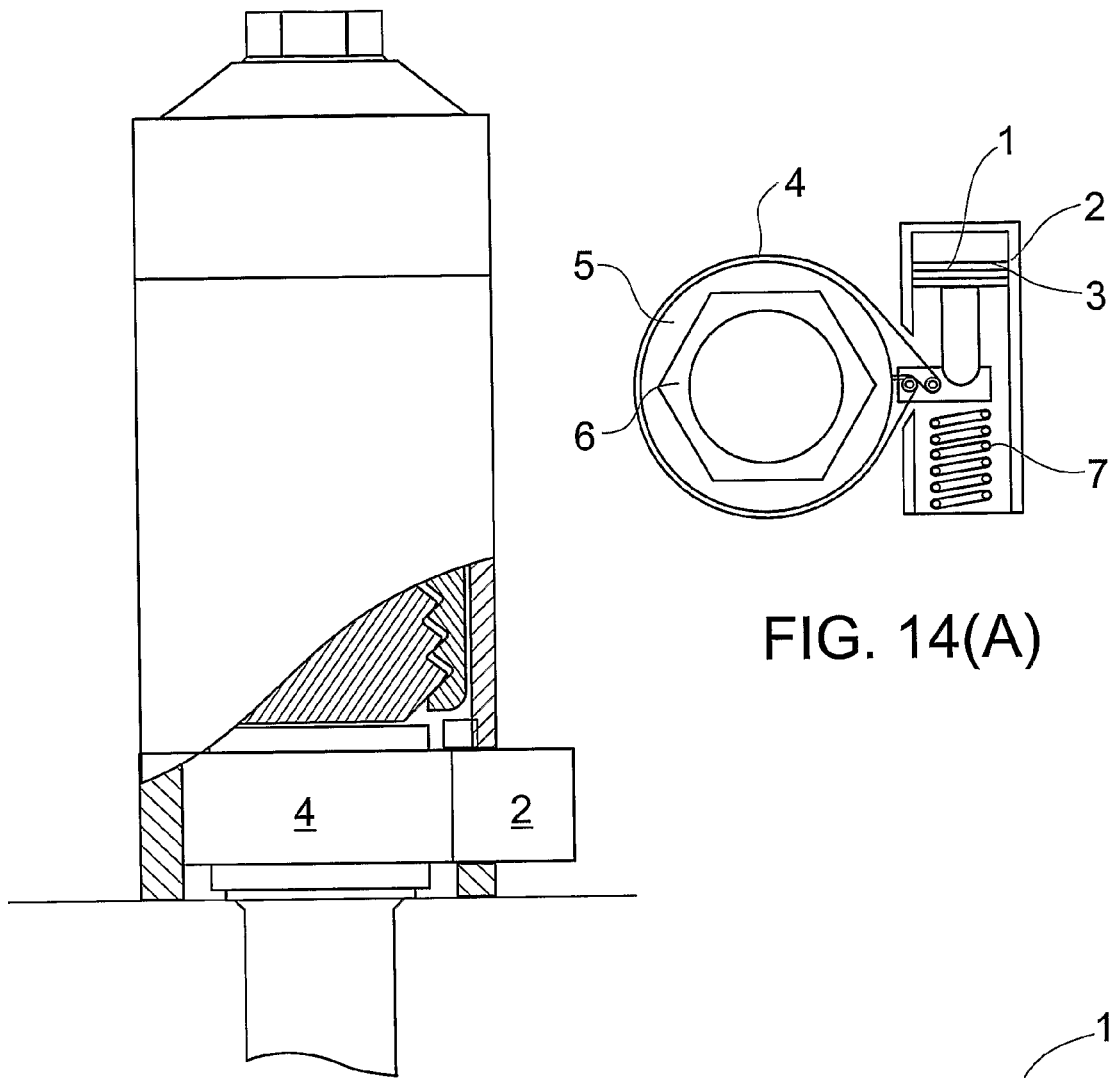
FIG. 14(A)
FIG. 14(B)
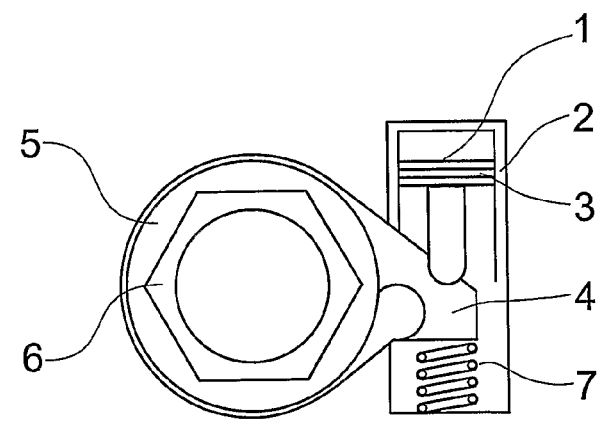
FIG. 14(C)

HYDRAULIC TENSIONING JACKS

CROSS-REFERENCE TO RELATED APPLICATIONS

This application claims the benefit of PCT Application Ser. No. PCT/AU2005/000877 filed Jun. 17, 2005, and Australian Patent Application Ser. No. 2004903276, filed Jun. 17, 2004

BACKGROUND OF THE INVENTION

1. Field of the Invention

THIS INVENTION relates to hydraulic tensioning jacks to tension fasteners; tensioning systems for the fasteners; and structures and accessories for use therewith.

2. Prior Art

The principles of applying bolt tensile loadings using hydraulic means to generate precise amounts of force are well known and established. In general, use of such equipment requires that bolts be extended above the nut to allow the tensioner's puller to attach. In many instances, this may not be possible or desirable. For example, the bolts securing turbines and other steam generating equipment are expensive to replace, and longer bolts would require extensive modification of heat shielding and ancillary equipment. I have previously proposed a method of providing a coupling to the bolts, which would permit the use of hydraulic tensioning apparatus with such equipment, in International Publication WO 00/51791 (=PCT/AU00/00138).

Clearly, such a coupling must be capable of transmitting the extremely high force necessary to elongate the bolt shank.

Tapered threaded couplings are known, and are commonly used in applications such as coupling "pin & box" ends for drill rods. However, the restricted available dimensions and extreme load requirements of high strength bolted joints mean that a coupling made to these designs would be incapable of carrying such forces, were they manufactured to fit into such limited spaces.

Normal tapered thread constructions have limitations:—
 the load carrying capacity for nominal sectional area is too low; and
 the included flank angles of threads deflect forces radially outwards.

When used in a standard format by other manufacturers for bolt tensioning on steam turbines, these thread forms proved ineffective and dangerous, with many breaking and "launching" the tensioner assembly skywards.

SUMMARY OF THE INVENTION

It is an object of the present invention to provide a method of connecting a hydraulic tensioning jack to a bolt to be tensioned by the use of an elongate nut, where the nut transfers the tensile load from the hydraulic tensioning jack to the bolt.

It is a preferred object to provide an adjustable spacer means, operable to be placed under the nut, to close the strain gap as the bolt is tensioned.

It is a further preferred object to provide a quick-release connection between the jack and the nut.

It is a still further preferred object to provide a quick-release connection between a hydraulic tensioning jack and a bolt to be tensioned, where the bolt extends above the tensioning nut.

Other preferred objects will become apparent from the following description.

The term "bolt" shall be used throughout the specification to include studbolts, studs and other fasteners used to connect two or more components/articles/items together.

In one aspect, the present invention resides in a method of tensioning a bolt including the steps of:
 applying a nut to the bolt, where the nut extends beyond the shank of the bolt; and
 connecting a tensioning apparatus to the nut; so arranged that the nut transfers the tensile load generated by the tensioning apparatus to the bolt.

Preferably, an expanding spacer is interposed, about the bolt, between the nut and a component to be clamped, the expanding spacer being axially extendable to take up the strain gap between the nut and the component as the bolt is tensioned by the tensile load.

Preferably, a segmented sleeve is provided on the puller bar of the tensioning apparatus and is selectively engageable with the nut to provide a releasable connection between the puller bar and the nut.

Preferably, the segments of the sleeve and puller bar have complementary thread profiles to form a high strength Buttress-threaded Tapered Cone (BTC) coupling between the sleeve and the puller bar (hereinafter referred to as a "BTC coupling" throughout the description and claims).

Preferably, a peripheral ring, or other operating means, selectively radially retracts or extends the segments, relative to the puller bar, out of, or into, engagement with the nut.

In a second aspect, the present invention resides in an apparatus for effecting the method of the first aspect.

In a third aspect, the present invention resides in a method of tensioning a bolt using a tensioning apparatus, wherein:
 a segmented sleeve is operably engaged with a puller collar or bar on the tensioning apparatus and is selectively engageable with the bolt.

Preferably, the segmented sleeve has a plurality of segments radially extendible into engagement with the bolt.

Preferably, the segments and the puller collar or bar have complementary thread profiles to form a BTC coupling between the segmented sleeve and the puller collar or bar.

Preferably, mechanical or hydraulic means selectively move the segments radially into, or out of, engagement with the nut.

BRIEF DESCRIPTION OF THE DRAWINGS

To enable the invention to be fully understood, preferred embodiments will now be described with reference to the accompanying drawings, in which:

FIGS. 9C and D are perspective views of an alternative segmented sleeve as assembled and "exploded";

FIGS. 9E and 9F are similar views of a further alternative segmented sleeve;

FIGS. 14A to 14C are top plan, top plan and side views of a tenth embodiment.

DETAILED DESCRIPTION OF THE PREFERRED EMBODIMENTS

As disclosed in International Publication WO 00/51791, the high strength Buttress-threaded Tapered Cone (BTC) coupling, as used with the embodiments hereinafter described and illustrated, has the added advantage of being very quick to engage. A normal parallel threaded coupling has to be rotated through every turn of its engaged length, whereas the buttresses of the BTC coupling will be fully home in some 2-3 turns, depending on the taper angle and pitch.

Figure 1:
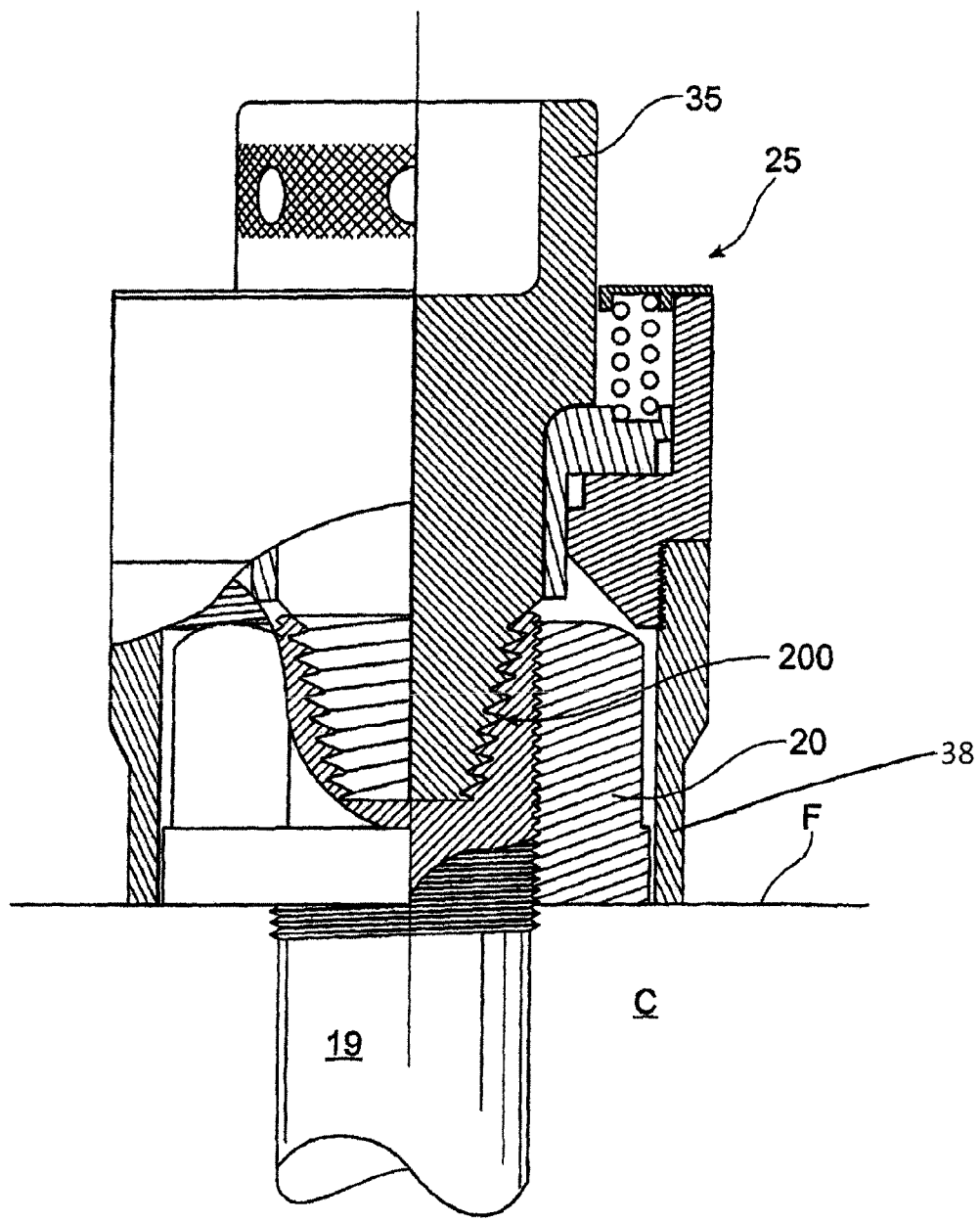
FIG. 1 is a sectional side view of a conventional hydraulic bolt tensioner, fitted with the BTC coupling of International Publication WO 00/51791.

FIG. 1 is an example of a known hydraulic tensioner in accordance with International Publication WO 00/51791, where the puller bar 35 of the tensioning apparatus 25 is internally coupled, via a BTC coupling 200, to the bolt 19, fitted with nut 20. A bridge 38 extends around the nut 20 and engages the face F of a component C to be clamped by the tensioned bolt 19 (and nut 20).

Figure 2:
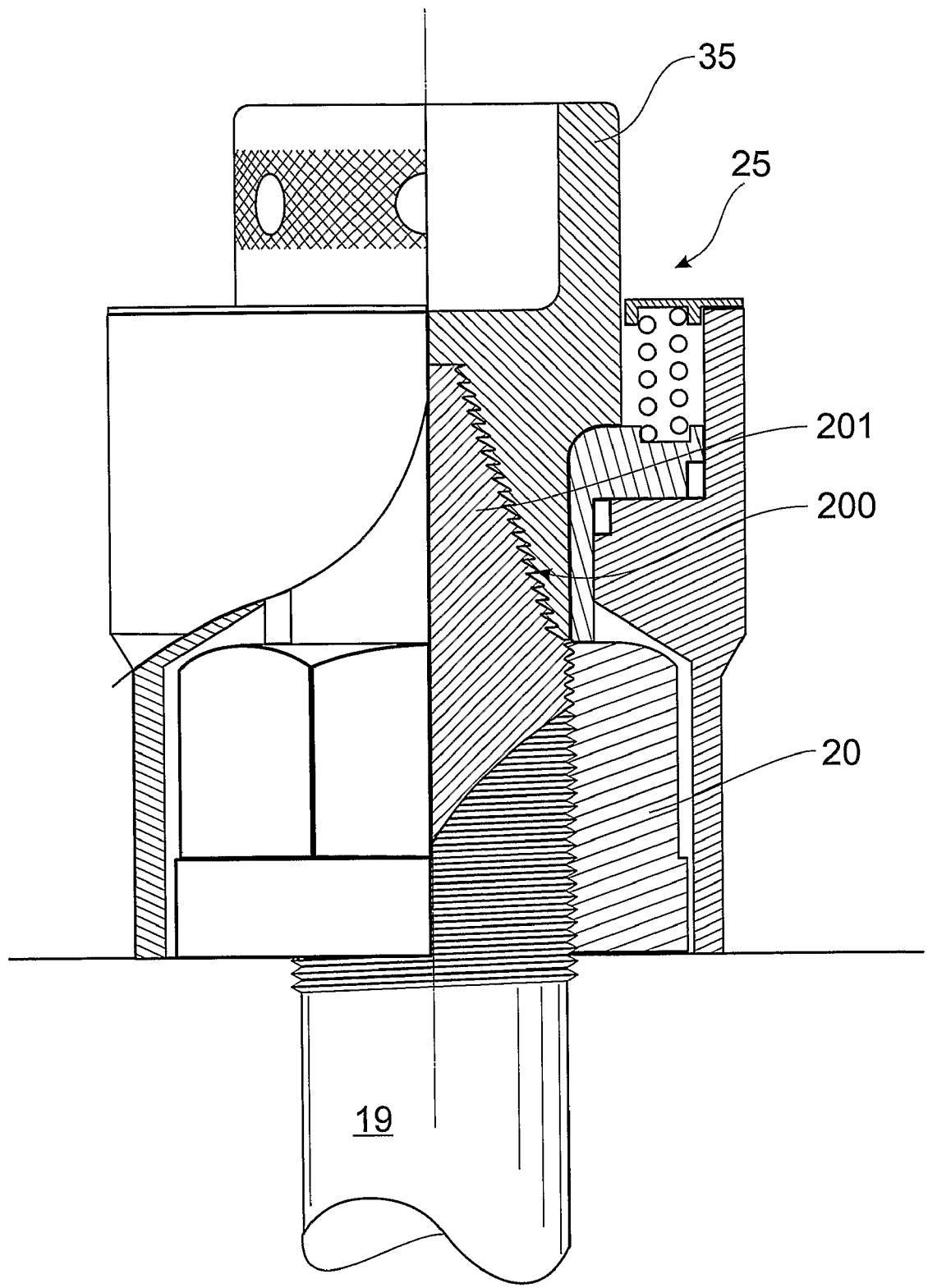
FIG. 2 is a similar view of a new embodiment of the known hydraulic bolt tensioner.

In the embodiment of FIG. 2, the bolt 19 has been fitted with the male portion 201 of the BTC coupling 200.

In both embodiments, the bolt 19 extends above the top of the nut 20.

In the embodiment of FIG. 2, the tapered thread may be used to activate the segments in the coupling segments to be hereinafter described, and not just provide a connection between the bolt 19 and the puller bar 35.

As hereinbefore described, it is not always possible to achieve the necessary coupling between the puller bar 35 and the bolt 19, due to the limited coupling length therebetween, i.e., the coupling could not sustain the very high tensile forces transferred from the puller bar 35 to the bolt 19.

In instances where bolts 19 are already fixed in position or machinery is not available to perform alternations, it is desirable to use an alternative system which will provide a fast and economical solution to such problems. If the bolt 19 cannot be extended, then it is proposed to use the nut 20 as an intermediate coupler between the standard bolt 19 and tensioner's puller shaft 35. Clearly, once under load, the nut cannot be screwed to meet the joint face F and retain load, so an alternative method must be found to close this "strain gap" which appears under the nut when the tensioner 25 is charged at pressure.

Figure 3A:
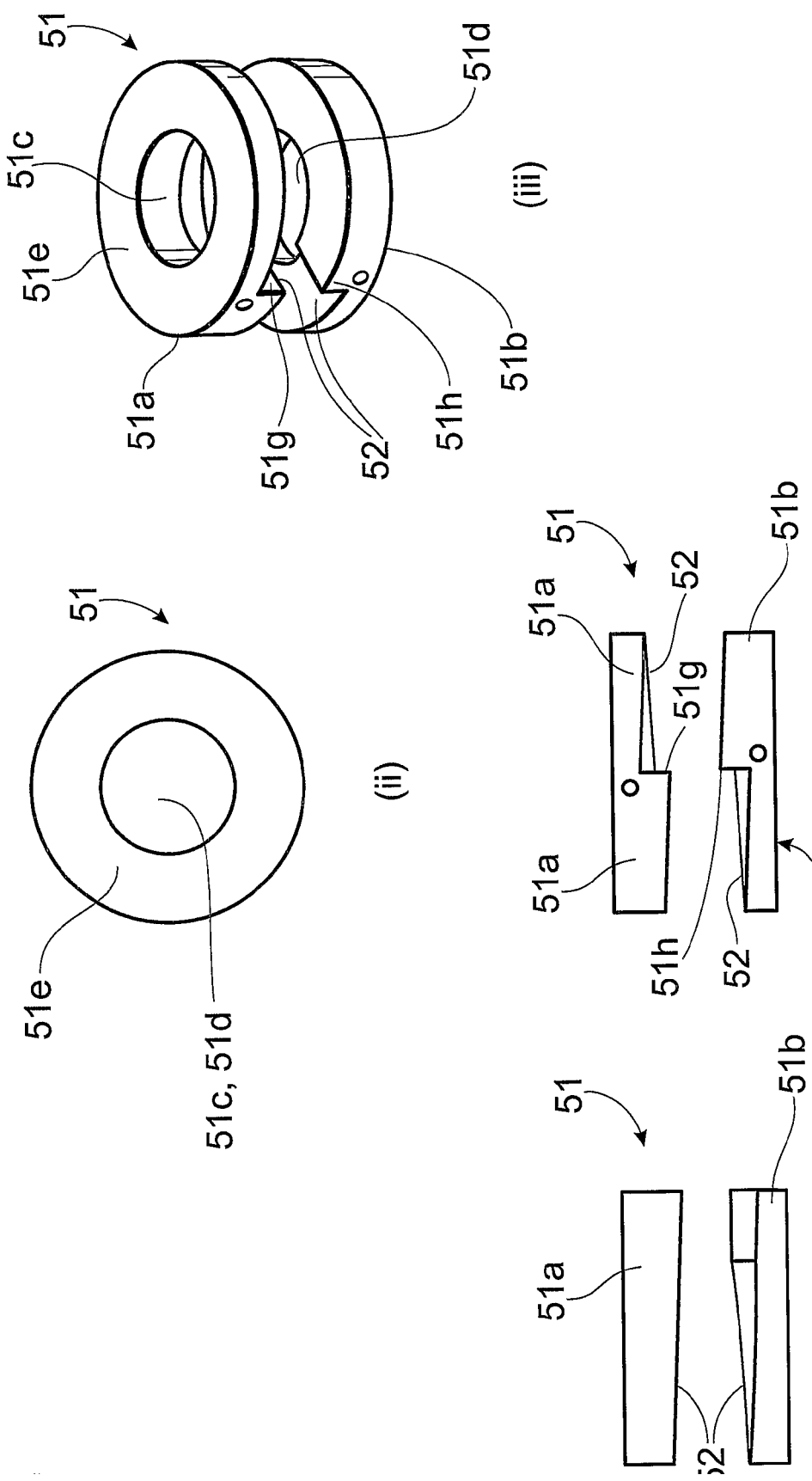
FIGS. 3A (i) to (iv) and 3B (i) to (iv) show alternative embodiments of the expandable spacer placed under the nut.

FIGS. 3A (i) to (iv) and 3B (i) to (iv) show two types of expanding spacers 51,53 which can be placed under the nut to close the strain gap. The expanding spacer 51 of FIGS. 3A (i) to (iv) has two complementary spacer halves 51a, 51b, each with a substantially circular bore 51c, 51d and a planar end face 51e, 51f.

The spacer halves 51a, 51b have helically ramped faces 52, terminated by abutment faces 51g, 51h. The angle of inclination of the ramp faces 52 to the planar end faces 51e, 51f will be selected so that there will be no relative rotational motion between the spacer halves 51a, 51b when the expanding spacer 51 is interposed between the nut 20 and the component. A typical angle is 13°.

Figure 3B:
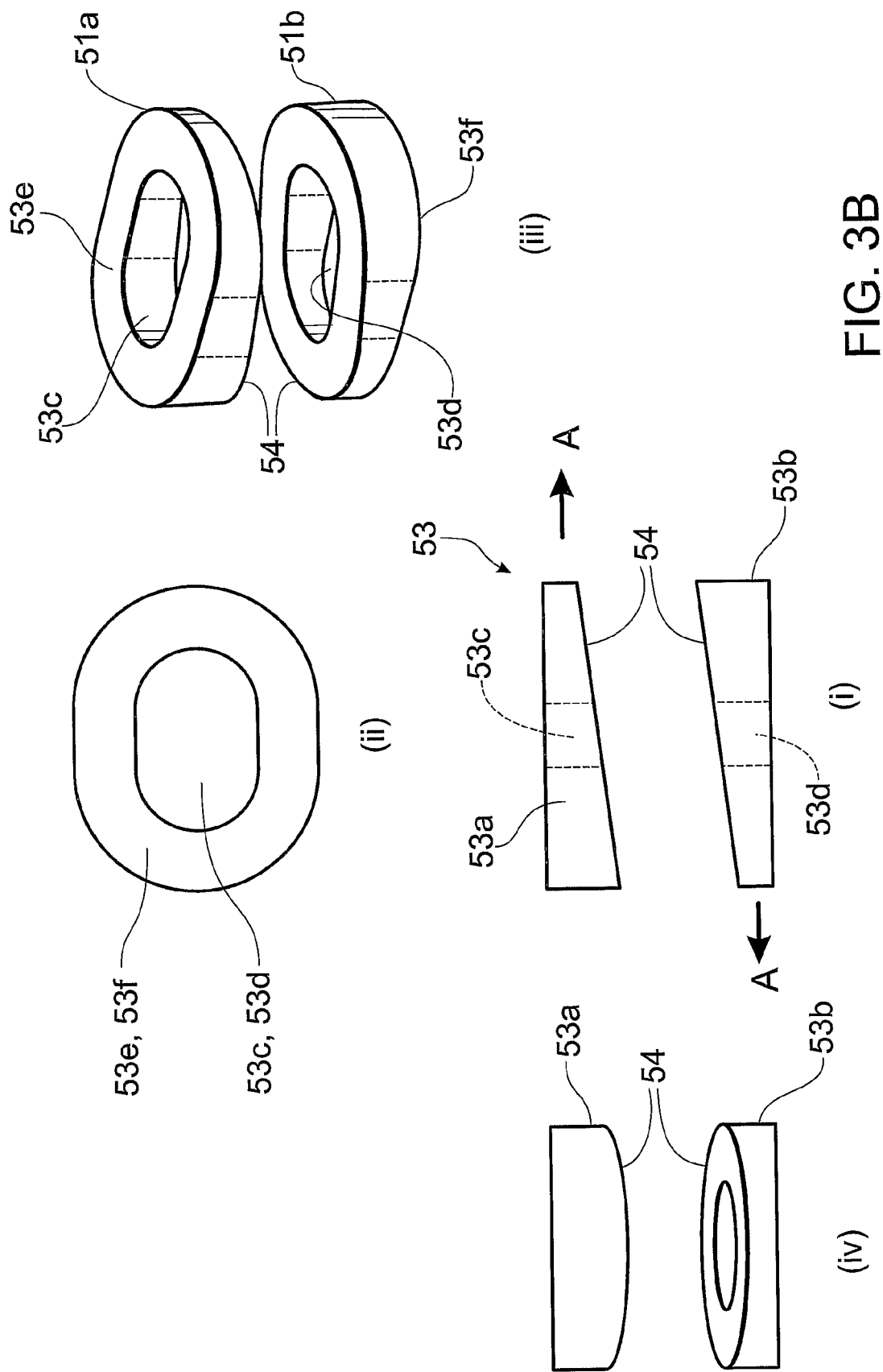

The expanding spacer 53 of FIGS. 3B (i) to (iv) has spacer halves 53a, 53b, which are substantially elliptical in plan view—see FIG. 3B (ii), with elongate bores 53c, 53d and planar end faces 53e, 53f.

The spacer halves 53a, 53b have respective ramp faces 54 which are arranged to cause the axial length of the expanding spacer 53 to be increased as the spacer halves 53a, 53b are moved relative to each other in the direction of the arrows A in FIG. 3B (i). Again, the angles of the ramp faces 54 will be selected to prevent relative lateral movement of the spacer halves 53a, 53b as the clamping force is applied by the nut 20 when the tensioner 25 is released.

The expanding spacer 53 may be fitted with simple mechanisms (not shown), such as an eccentric drive ring, to simplify the simultaneous insertion of the spacer halves 53a, 53b.

Figure 4:
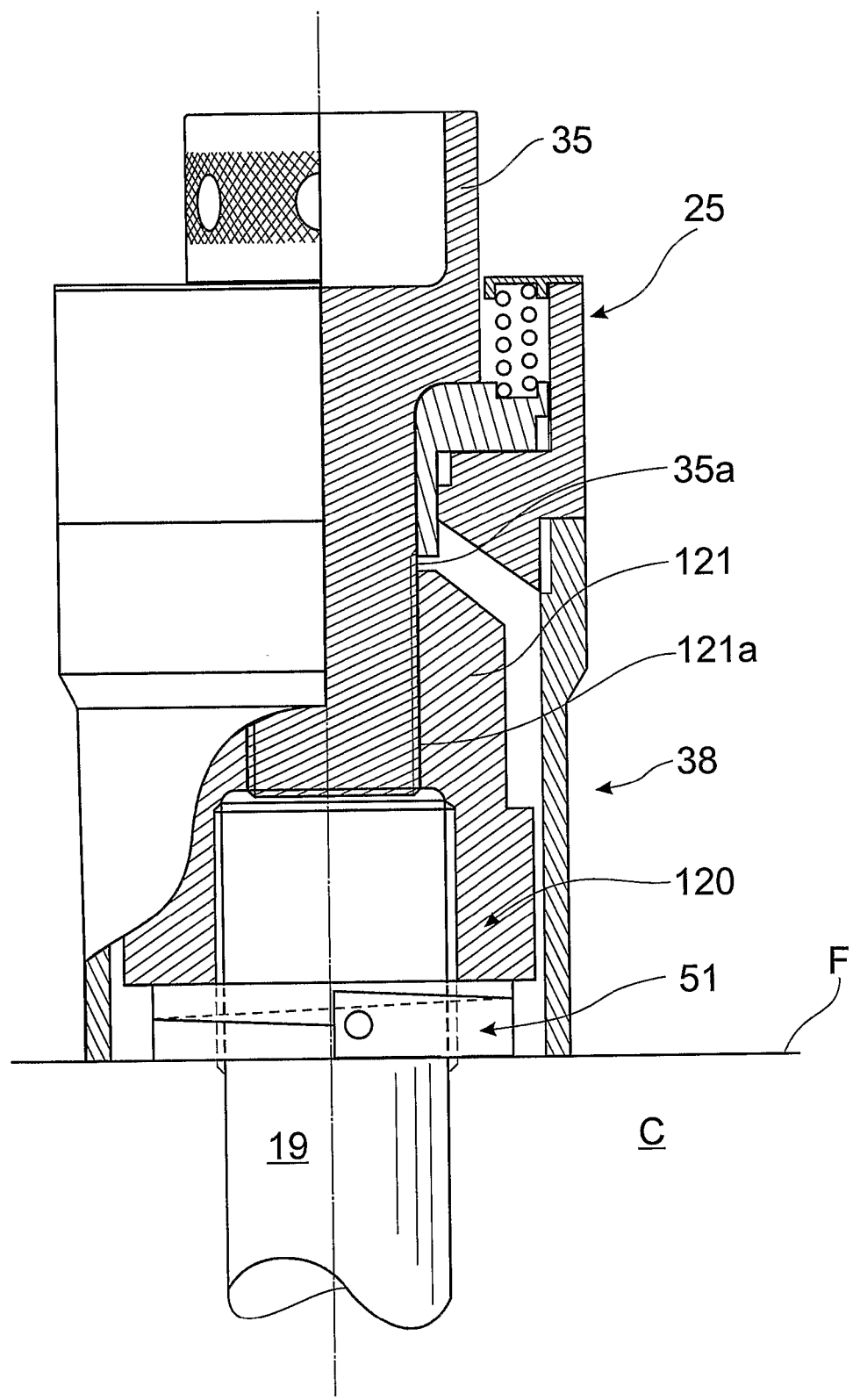
FIGS. 4 and 5 are respective sectional side views of first and second embodiments of the present invention.

Referring now to FIG. 4, an expanding spacer 51 is interposed between the face F of the component C and the lower face of nut 120, which extends above the bolt 19, the extension portion 121 of the nut 120 having a parallel thread 121a complementary to the external thread 35a on the puller bar 35 of the tensioning apparatus 25.

The nut 120 provides an intermediate coupler between the puller bar 35 and bolt 19, to enable the tensile loads to be transmitted therebetween.

As the nut 120 cannot be screwed about bolt 19 to remain in contact with the face F, the expanding spacer 51 is operated, by relative rotation of the two halves 51a, 51b, to close the "strain gap" between the nut 120 and face F.

Figure 5:
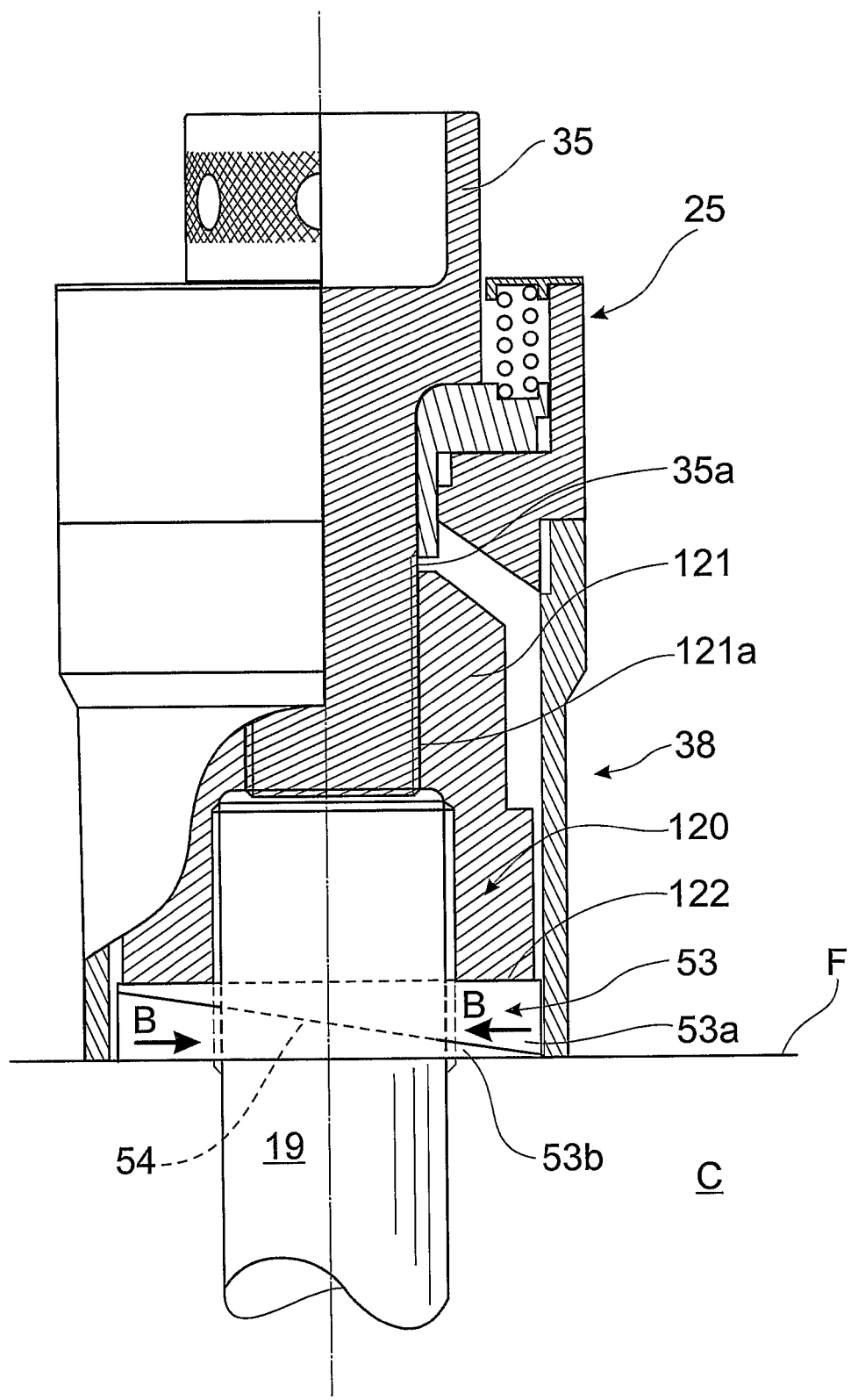

In the embodiment of FIG. 5, the expandable spacer 51 is replaced by the expandable spacer 53.

When the puller bar 35 has applied the desired tension to the nut 120, the spacer halves 53a, 53b are moved in the direction of the arrows B to axially expand the spacer 53 and occupy the space between the lower face 122 of the nut 120 and the face F of the component C. The angle of the ramp faces 54 on the spacer halves 53a, 53b preclude any lateral movement of the spacer halves 53a, 53b when the tension applied to the nut 120 by the puller bar 35 is released.

Figure 6:
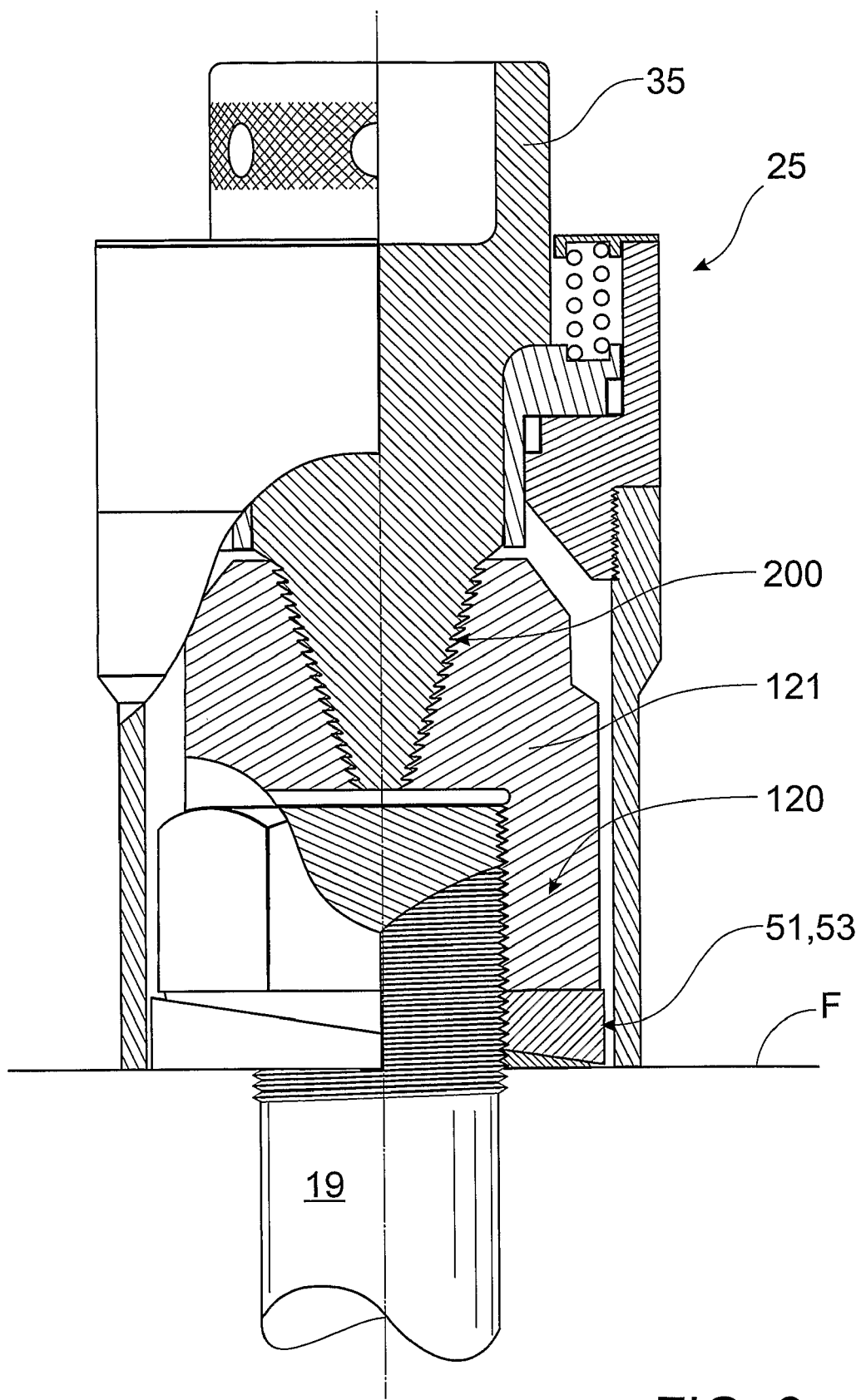
FIG. 6 shows a similar view of a third embodiment, where a BTC coupling is provided between the nut and the puller bar.

In the embodiment of FIG. 6, the extension portion 121 of the nut 120 and the puller bar 35 are provided with the quick release BTC coupling 200 of the type hereinbefore described.

It will be readily apparent to the skilled addressee that the use of the "extended" nut 120, and expanding spacers 51,53, enable effective transfer of the tensile loads to the bolts 19, which may not otherwise be possible, without changing the existing bolts 19.

Figure 7:
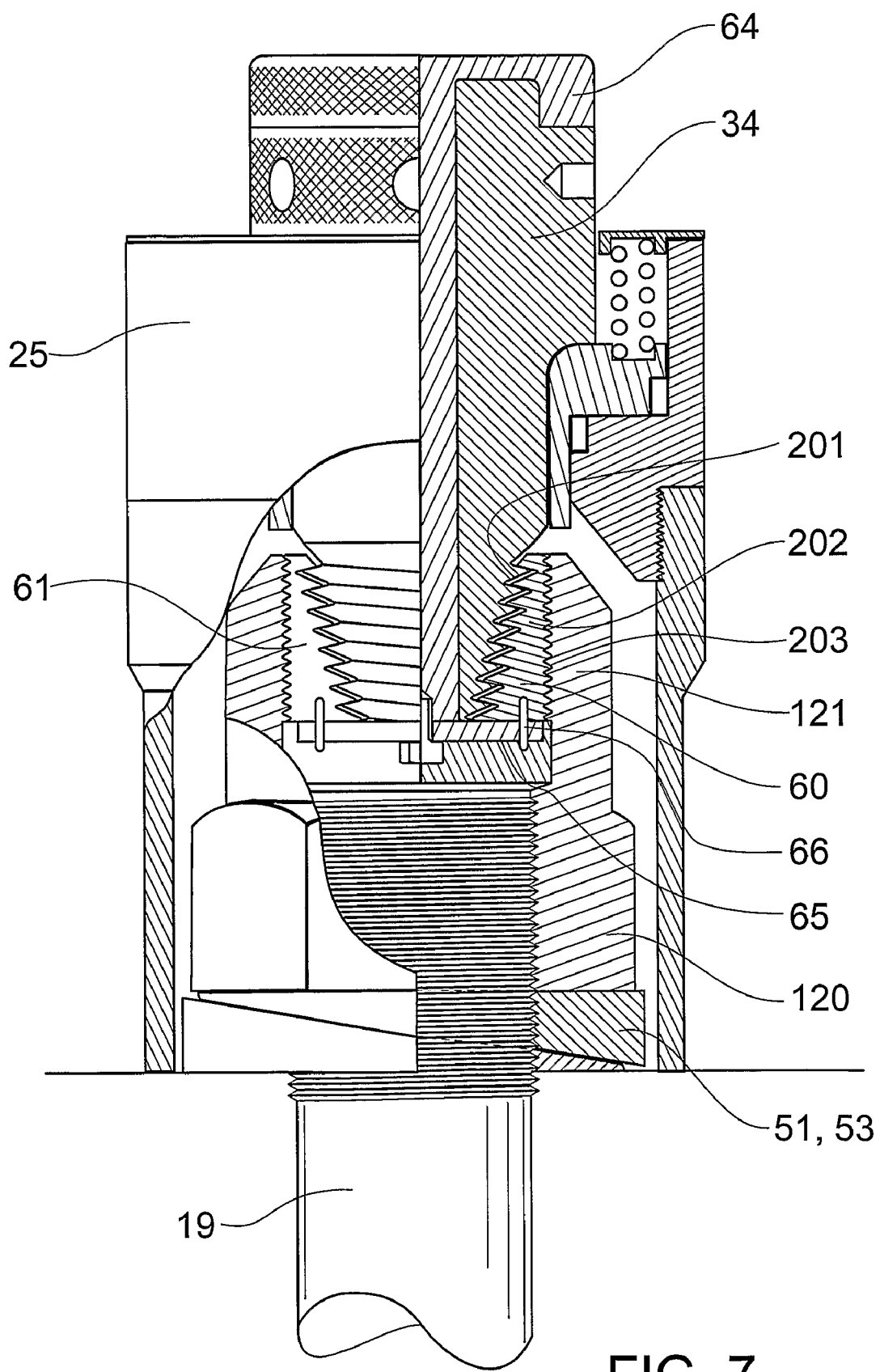
FIG. 7 is a similar view of a fourth embodiment where a BTC is used to activate mobile segments to form a "quick-connect" coupling between the nut and the puller bar.
Figure 8:
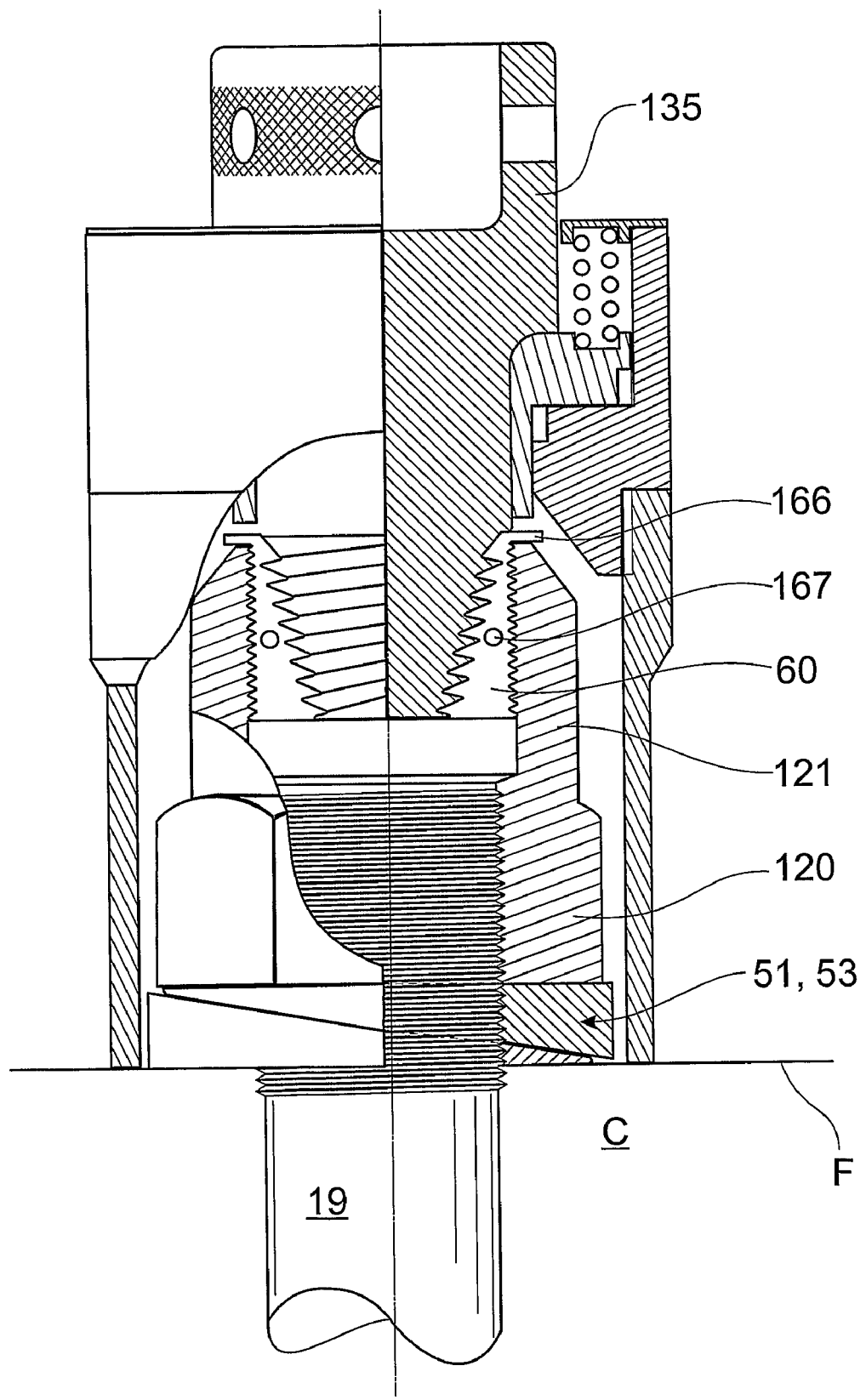
FIGS. 8 and 8A are respective sectional side elevational and side perspective views of a fifth embodiment as assembled.

FIGS. 7 and 8 show bolt tensioning assemblies as described above with the addition of a "quick-connect" coupling in semi-automatic and fully automatic configurations. These will be discussed in more detail following.

Hydraulic Bolt Tensioners are widely accepted as being an accurate and reliable means of applying bolt tension. The slowest part of their operation is the mounting and removal of the tool onto the stud. It has been most desirable to produce tools which can avoid having to undertake the lengthy process of winding their connecting pieces on and off.

I have developed a variety of devices which exhibit rapid deployment along the thread and can be used to make hydraulic tensioners with automated nut to bolt engagement.

As shown in FIG. 7, the puller bar 35 is provided with a segmented sleeve 60, to provide a "quick-release" connection of the nut 120 to the puller bar 35.

The segmented sleeve 60 has three segments 61, where buttress-threads 202, 201 in the segments 61, and the puller bar 35, provide the BTC coupling 200 between the puller bar 35 and the segments 61, and allow the segments, which have external threads 203, to be moved radially outwardly to engage the threads in the extension 121 on nut 120.

A locking mechanism 64 extends through the puller bar 35 and has a drive plate 65 at its inner end, with drive pins 66 engaged in grooves in the end faces of the segments 61.

The grooves are radially "ramped" so that rotation of the drive plate 65 causes the segments 61 to more radially into, or out of, engagement with the internal threads in the extension portion 121 of the extended nut 120.

It will be noted that the extended portion 121 of the nut 120 and the external faces of the segments have complementary parallel threads, while the puller bar 35 and internal faces of the segments 61 are connected by a BTC coupling 200.

In FIG. 7, the locking mechanism is activated by rotating the locking mechanism clockwise, this rotation being transmitted to the drive plate 65 and pins 66, and thence to the segmented sleeve 60. The action of the sleeve rotating against the cone thread of the puller bar 35 expands the segments 61 to fully engage the internal threads of the extended nut 120. The tensioner is pressurized and the spacer 51, 53 expanded to close the strain gap. Pressure is then released, and the tensioner disengaged by reversing the action of the locking mechanism 64 to retract the sleeve segments.

Figure 8A:
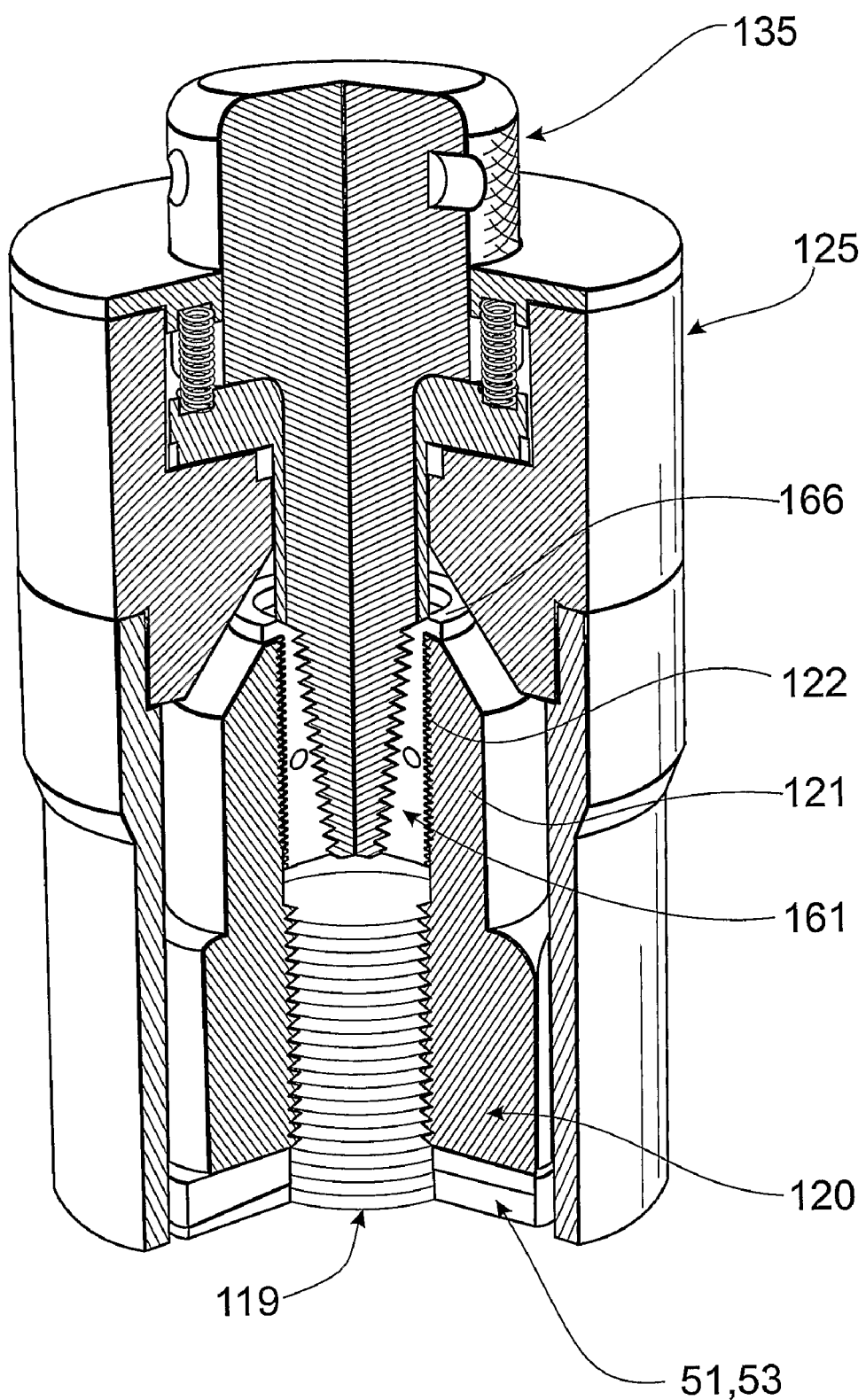
Figure 8B:
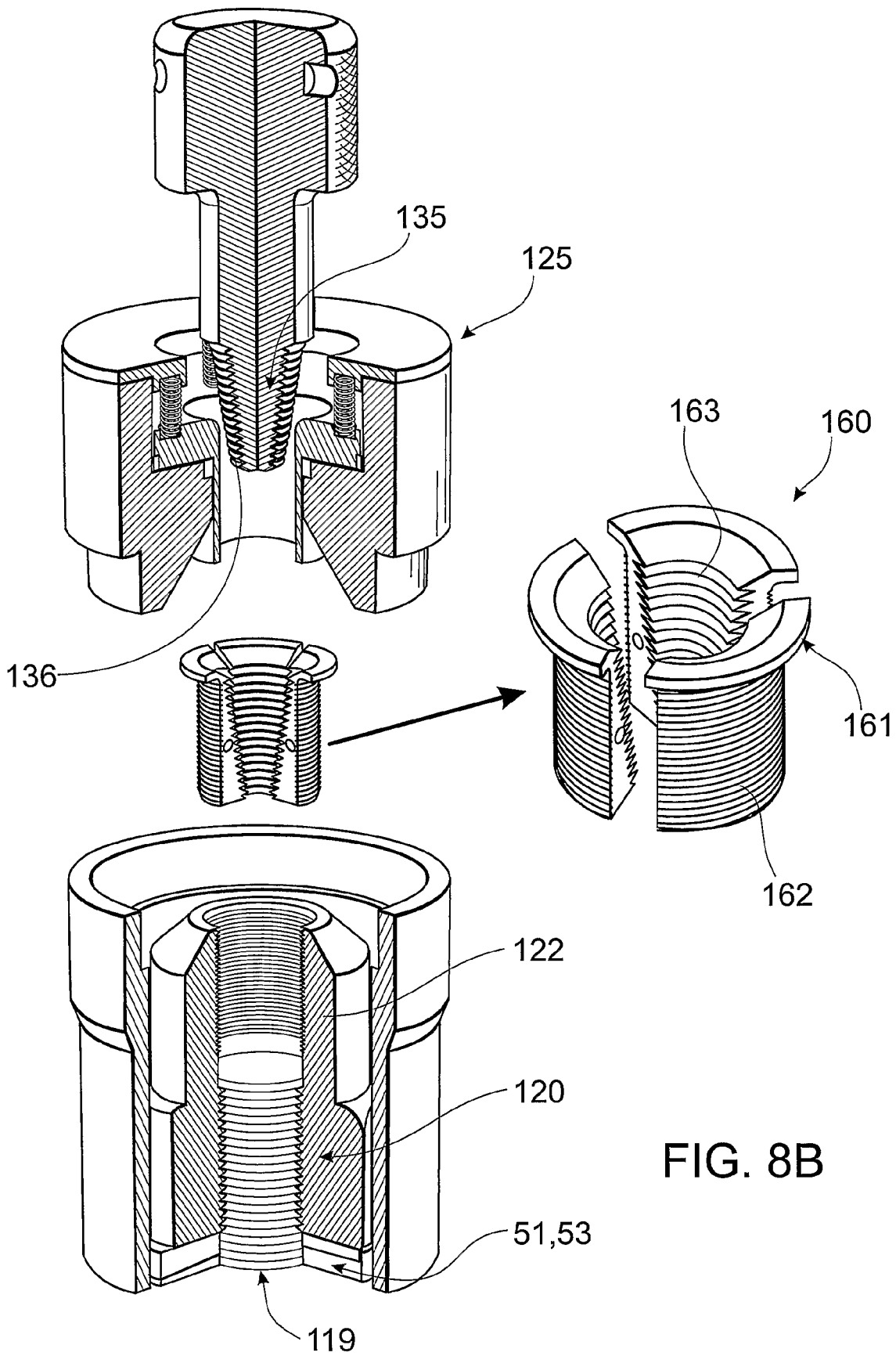
FIG. 8B is a sectional perspective view of the fifth embodiment "exploded"

FIGS. 8, 8A and 8B show a tensioner of similar construction wherein the action of expanding the sleeve to engage the internal thread of the extended nut 120 is initiated by rotating the puller bar 135 clockwise. The puller bar 135 engages a friction plate 166 on the segments 161. In this embodiment, the puller bar 135 must be free to rotate. The segments 161 are spring-loaded to retract from engagement when the puller bar 135 is screwed counter-clockwise.

Referring to FIGS. 8 and 8B, the segments 161 of the collar 160 have external threads 162 engageable with the threads 122 in the extension 121 of the nut 120 engaged with bolt 119 to be tensioned.

The internal threads 163 in the segments 161 are designed to form a BTC coupling with the threads 136 on the puller bar 135 of the hydraulic tensioner 125. As the puller bar 135 is moved upwardly (ie., away from the nut 120), the segments 161, engaged with the puller bar 135, move radially outwardly into engagement with the extension 121 of nut 120 to enable the nut 120 to apply the tensioning load to the bolt 119.

Figure 9A:
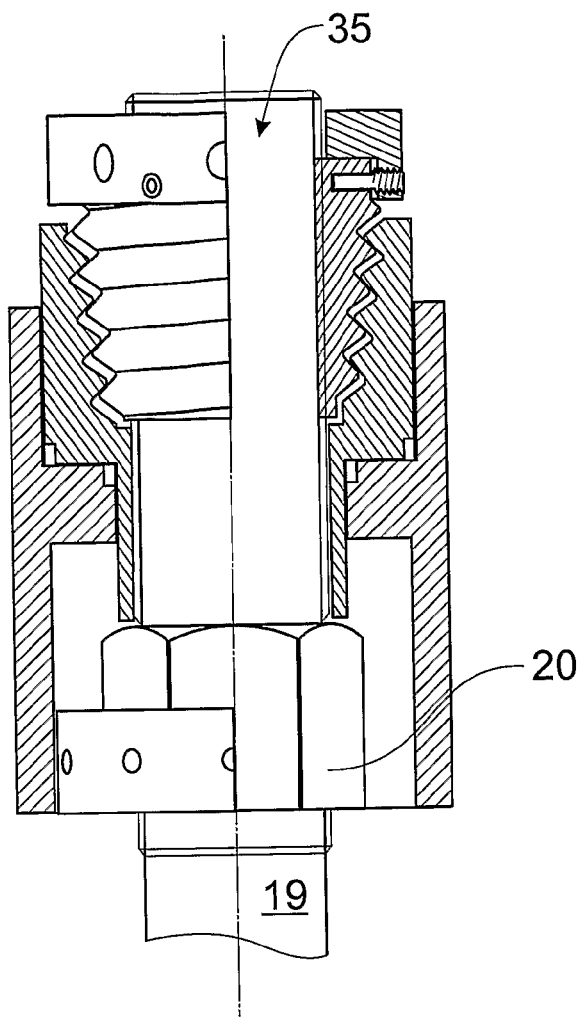
FIGS. 9A and 9B are sectional side views of a sixth embodiment with a segment sleeve fitted to a bolt.
Figure 9B:
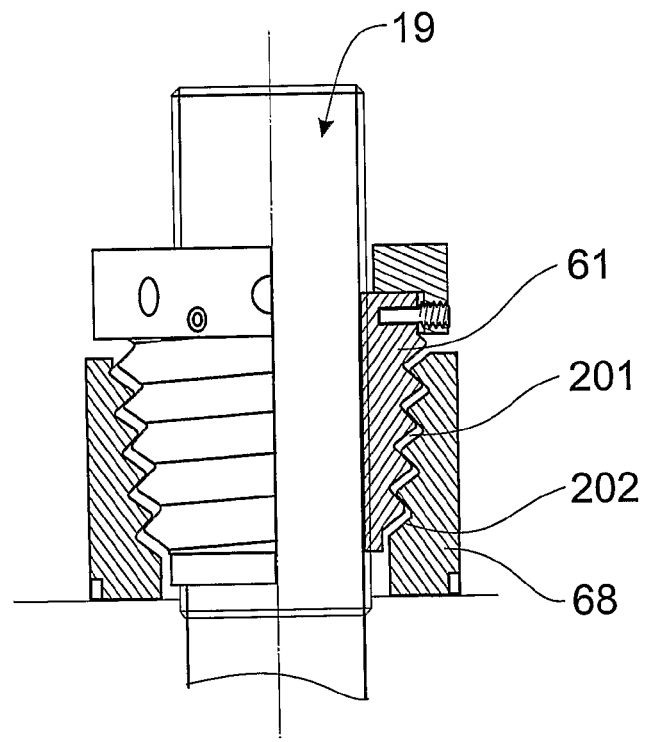

FIGS. 9A and 9B show a quick-release tensioner with the above retaining mechanisms. In this case, the segments 61 and base cup 68 have complementary threads. Clearly, if this nut were to close onto the bolt without causing interference between its conic thread and that of the bolt interface, then the pitch of the conic thread should ideally be selected to produce movement laterally and axially compatible with the flank angle of the bolt thread. If the pitch was equal, this would occur naturally, but in order to close the sleeve rapidly, it is most desirable to have a large pitch on the conic thread.

FIGS. 9C and 9D; and 9E and 9F, illustrate respective segmented connectors which employ a taper cup rather than a threaded cup, to be activated by movement of various hand-rotated "components".

The connector 360 of FIGS. 9C and 9D has a single top cap 362 engaged with the three segments 361 seated in conical cup 368. The top cap 362 has pins 369 received in grooves 369a in about the segments 361.

The top cap 362 is pushed down and rotated to cause the internal threads 363 to engage, eg., a bolt (not shown). The rotation of the cap 362 causes the segments 361 to be rotated about, and move down, the bolt and into the cup 368, locking the segments 361 into engagement with the bolt.

The "double cap" connector 460 of FIGS. 9E and 9F allows the operator to hold one cap and rotate the other to effect engagement. The connector 460 is spring-loaded to snap onto the bolt and provides a stand-off position when removed by reverse rotation.

The connector 460 has an operating ring (or cap) 465 with elongated, curved slots 467 which receive pins (not shown) that pass through radial slots 468 in the cap 462 and are received in holes 469 in the segments 461. The slots 467 in the operating ring 465 are radially divergent in plan view so that, as the operating ring 465 is rotated relative to the cap 462, the pins are caused by slots 467 to move the segments 461 radially inwardly (or optionally), and downwardly, into locking engagement (or upwardly for release) in the tapered cup 470, with the internal threads 463 locked to the bolt (not shown).

FIGS. 10A to 10D demonstrate the relationship between pitch and lateral displacement, assuming a 45° cone angle, generating 1:1 axial Vs lateral movement. The amount of lateral displacement per rotation will be described by the cone angle, which therefore correlates with the selected pitch of the drive thread.

Figure 10A:
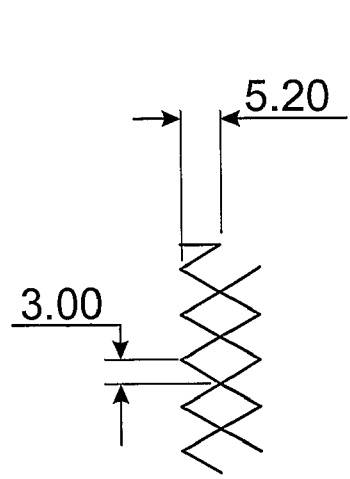
FIGS. 10A to 10D illustrate the relationship of lateral displacement to pitch for the thread profiles.
Figure 10B:
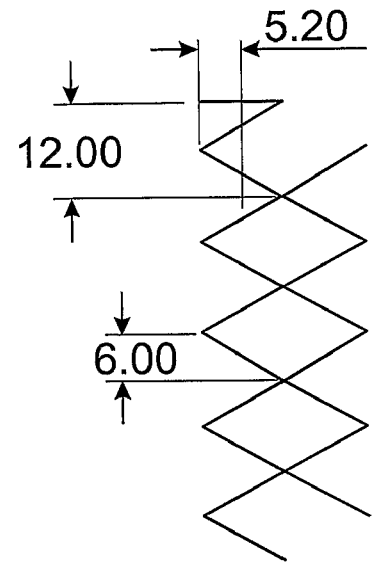

FIG. 10A shows the maximum lateral displacement required, generated by a ½ turn of a cone with a thread pitch of 6 mm; while FIG. 10B illustrates the displacement generated by a ¼ turn of a cone within a 12 mm thread pitch. (The angles must be complementary to generate equal lateral displacement during rotation.)

Figure 10C:
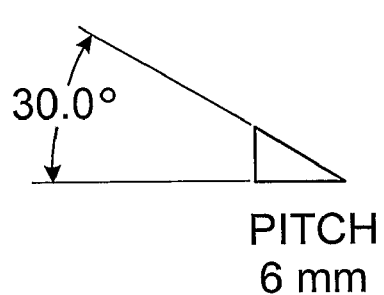
Figure 10D:
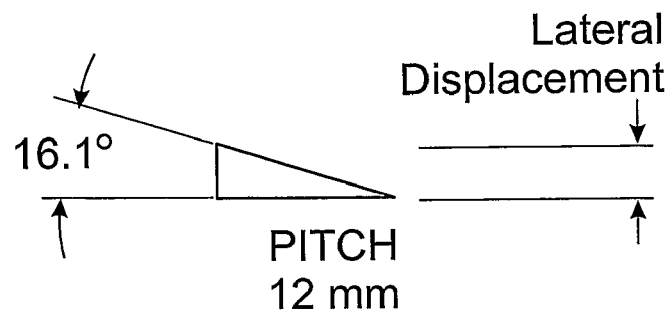

FIGS. 10C to 10D show the relationship between lateral displacement, thread pitch and flank angle of the driving collar necessary to maintain equal incremental lateral movement.

A derivable driving flank angle can be calculated trigonometrically from known factors for any particular combination of thread forms.

It will be clear that this principle applies to fully threaded cones, part threaded cones, and also to drive pins acting in machined grooves in opposing cone surfaces or other mechanisms which can produce such movement.

This mechanism is also used in the provision of automated "bolt grabber" mechanisms which negate the need to screw tensioners on and off bolts for installation and removal.

Figure 11:
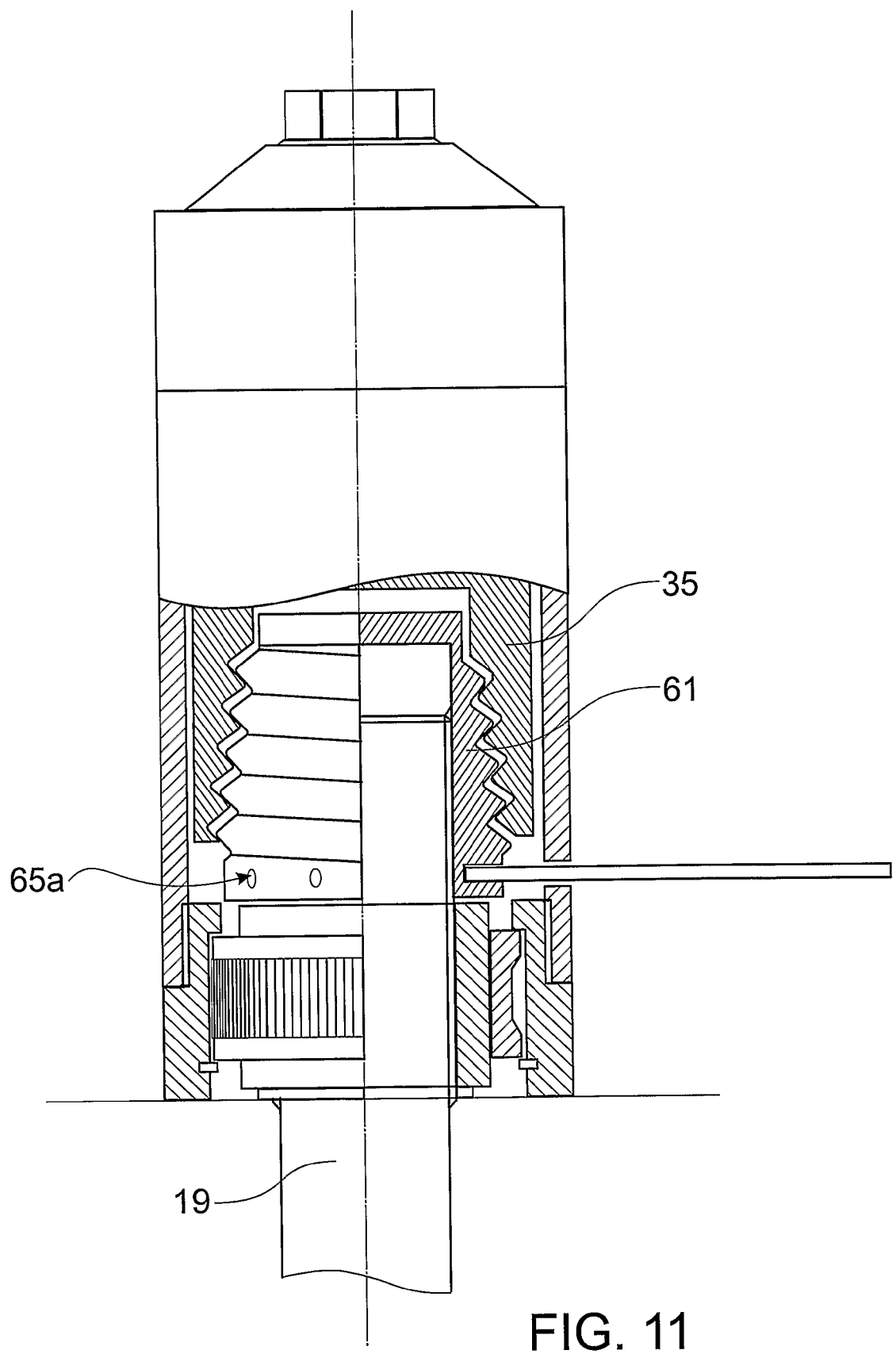
FIG. 11 is a sectional side view of a semi-automatic tensioner of a seventh embodiment.
Figure 12:
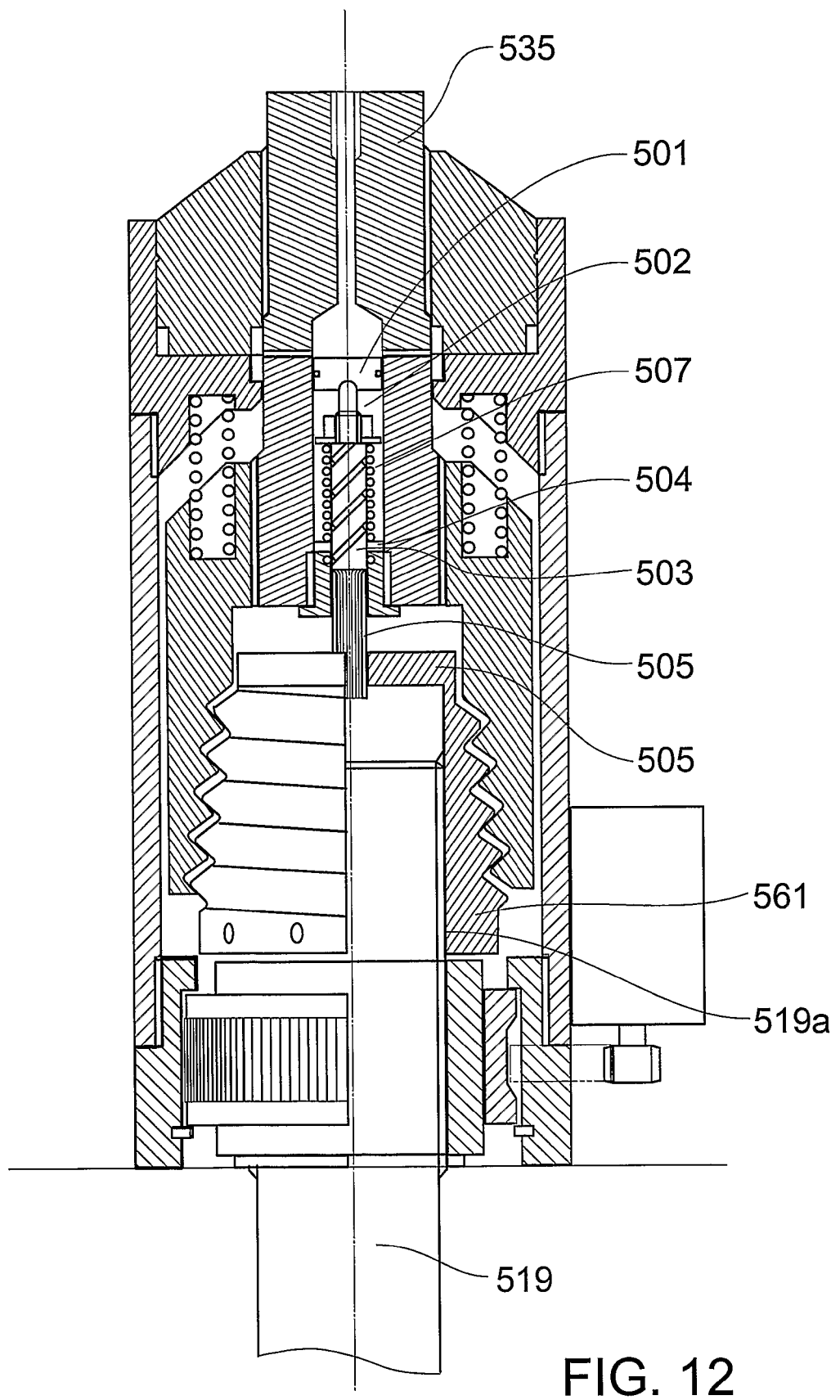
FIGS. 12 and 13A are similar views of eighth and ninth embodiments.

FIG. 11 shows such a tensioner wherein closure of the segmented sleeve is accomplished by turning it clockwise using the drive pin 65. This action closes the mechanism onto the bolt thread as the segments 61 are forced into the cone. Tensile load is then applied hydraulically via the puller 35 with radial thrust forces generated from reaction from the thread's flanks seeking to tighten the grip of the device onto the stud 19. It is possible to add further automation to this type of tensioner by triggering the movement of the segmented sleeves, for example by using a rotational assembly which engages segmented sleeves directly similar to that of FIG. 7, a puller bar and collar rotating independently of the tensioner body as in FIG. 8, or by adding hydraulic means such as a small cylinder or motor to replicate the action of locking using the drive pin of FIG. 11. A tensioner with such automation is shown in FIG. 12, which also illustrates a means by which rotation of the internal components may be achieved hydraulically.

A hydraulic piston 501 in a cylinder 502 in puller bar 535 is connected to a double-start helix rod 503 which passes through a threaded plate 504. The distal end of the helix rod 503 has splines 505 engaged in a drive plate 506 and operable to rotate the segments 561 inwardly, relative to the puller bar 535, via the BTC coupling, the segments 561 engaging the threads 519a about bolt 519.

A return spring 507 urges the helix rod 503 to the segment-released position.

Figure 13A:
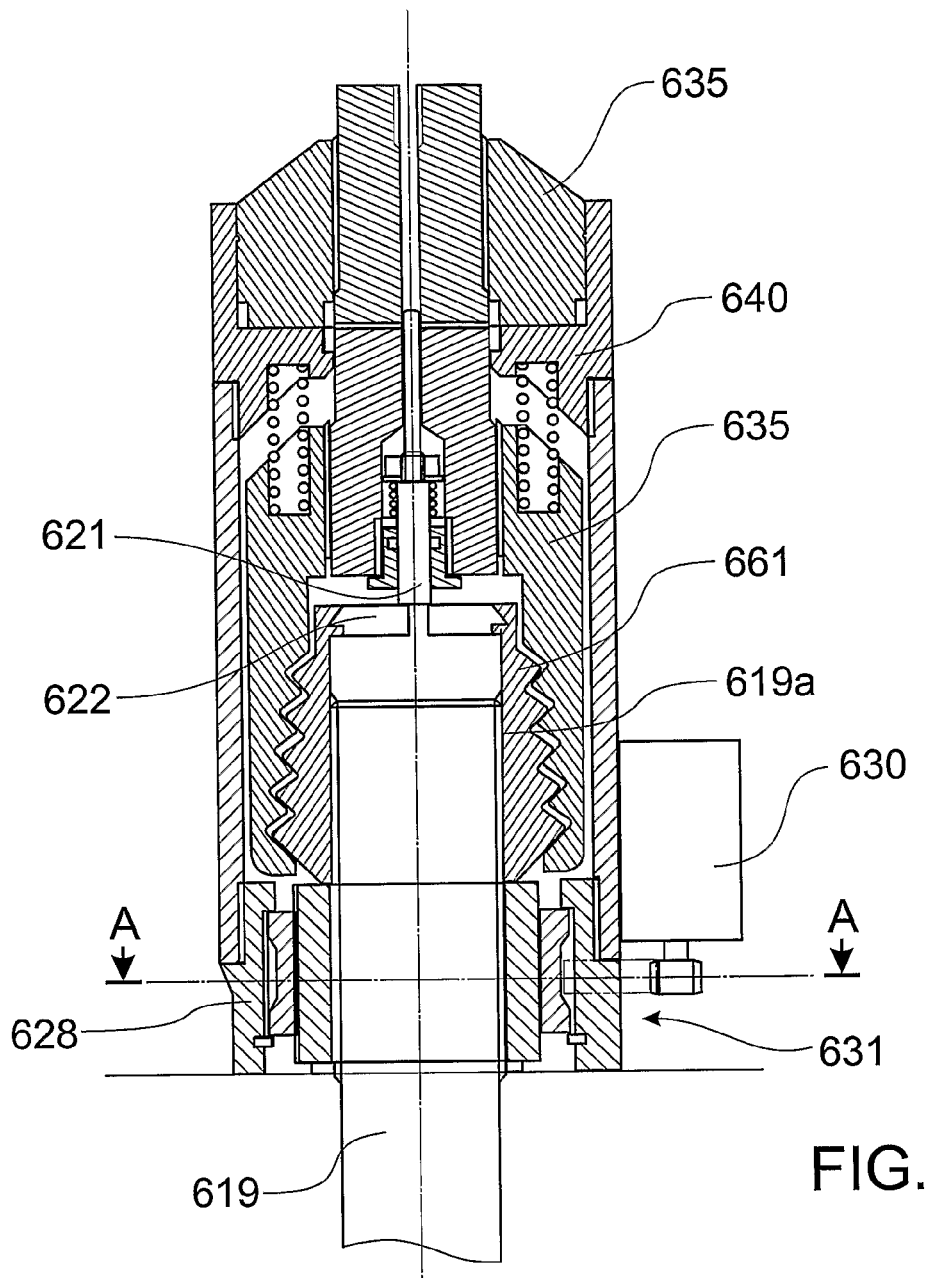
Figure 13B:
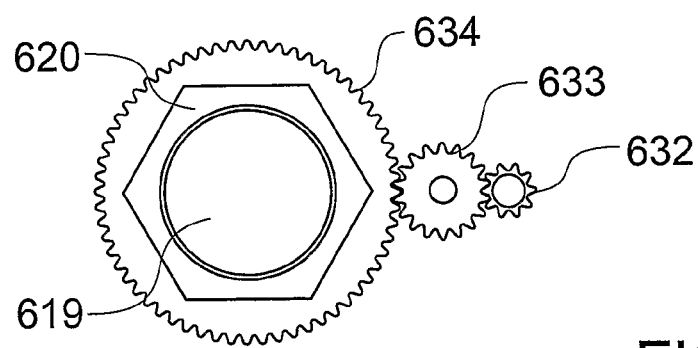
FIG. 13B is a top plan view of FIG. 13A.

FIGS. 13A and 13B show a further development of automated tensioners wherein the mechanism for engaging the bolt's thread 619 is initiated by hydraulic input pressure. Fluid introduced through the port 610, initiating movement of the lock piston 621 which then pushes upon the segmented sleeve 661 via the sleeve drive 622. The sleeve segments 661 are forced to engage the threads 619a of the bolt 619 as they are pushed radially inward by reaction from the flank angle of the puller collar 635. As working pressure increases, the retaining hex nut 620 is rotated into position by the hydraulic drive motor 630 acting through the gear train 631 illustrated. Removal of this nut 620 can be achieved by reversing the direction of the motor 630.

The gear train 631, as illustrated in FIG. 13B, has a driving gear 632 (connected to the motor 630), and intermediate gear 633 and a driven gear 634 about nut 620.

More control over the operation of the tensioner can be achieved by the addition of a sequencing valve 640 internally to allow the action of grabbing onto the thread to be completed before the tensioning force is applied.

A further means of rotating this hex nut is shown in FIGS. 14A to 14C. It is important to have components which are radially very slim to fit within the limitations imposed by bridge diameter and hex nuts. This is achieved by using a thin "strap wrench" configuration driven by a hydraulic piston 1, which can provide rapid rotation of the drive socket 5. This arrangement substitutes for the relatively strong gear ring of FIG. 13, and is a lightweight yet robust alternative, with significant cost savings in manufacture.

The hydraulic piston 1 is received in a cylinder 2 and sealed thereto by an hydraulic seal 3. The nose of the piston 1 engages a drive band 4 which has a metal band or strip around a drive socket 5 fitted to a hex nut 6 on the collar. A return spring 7 (see FIG. 14B or toggle drive 8 (see FIG. 14A) is provided in opposition to the piston 1 to allow release of the drive band 4.

In operation, the "stepless wrench" acts in similar fashion to a filter removal strap wrench. As force is applied from the hydraulic drive piston 1, the band 4 is tightened onto the socket 5 by the mechanical action generated (alternatives shown). The higher the force, the tighter the band 4 will grip in friction. The piston 1 reciprocates, drawing the band 4 back and then forcing it forward until it stalls out. At this time, the tensioner will have reached full working pressure, and the nut 6 will therefore be in place.

Clearly, this technology can be applied to other tensioner designs as illustrated herein, or can be used to make an independent hydraulically powered torque wrench.

It will be readily understood to the skilled addressee that the present invention provides many advantages over the prior art; and that various changes and modifications may be made thereto without departing from the present invention.

The invention claimed is:

1. A method of tensioning a bolt including the steps of:
applying a nut to the bolt, where the nut extends beyond the shank of the bolt;
connecting a tensioning apparatus to the nut; so arranged that the nut transfers a tensile load generated by the tensioning apparatus to the bolt,
wherein the tension apparatus is screw threadably connected to internal threads of an extended portion of the nut, wherein a quick release connection between the tensioning apparatus and the nut is provided;
wherein an expanding spacer is interposed, about the bolt, between the nut and a component to be clamped, the expanding spacer being axially extendible to take up the strain gap between the nut and the component as the bolt is tensioned by the tensile load; and
wherein the expanding spacer has two spacer halves, each with a planar faces and an inclined ramp face and a bore to receive the bolt, the spacer halves being relatively rotated, or moved laterally, so that the opposed ramp faces of the spacer halves cause the axial distance between the respective planar faces of the spacer halves to be selectively increased or decreased;
wherein the angle of inclination of the ramped faces to the planar faces will be selected so that there will be no relative motion between the spacer halves when the expanding spacer is interposed between the nut and the component.

2. A method as claimed in claim 1 wherein:
a segmented sleeve is provided on a puller bar of the tensioning apparatus and is selectively engageable with the nut to provide a releasable connection between the puller bar and the nut.

3. A method as claimed in claim 2, wherein:
the segments of the sleeve and puller bar have complementary thread profiles to form a high strength Buttress-threaded Tapered Cone (BTC) coupling between the sleeve and the puller bar.

4. A method as claimed in claim 3, wherein:
a peripheral ring, or other operating means, selectively radially retracts or extends the segments, relative to the puller bar, out of, or into, engagement with the nut.

5. A method of tensioning a bolt including the steps of:
applying a nut to the bolt, where the nut extends beyond the shank of the bolt;
connecting a tensioning apparatus to the nut; so arranged that the nut transfers a tensile load generated by the tensioning apparatus to the bolt,
wherein the tension apparatus is screw threadably connected to internal threads of an extended portion of the nut, wherein a quick release connection between the tensioning apparatus and the nut is provided;
wherein the expanding spacer is interposed, about the bolt, between the nut and a component to be clamped, the expanding spacer being axially extendible to take up the strain gap between the nut and the component as the bolt is tensioned by the tensile load; and
wherein the expanding spacer has two spacer halves, each with a planar faces and an inclined ramp face and a bore to receive the bolt, the spacer halves being relatively rotated, so that the opposed ramp faces of the spacer halves cause the axial distance between the respective planar faces of the spacer halves to be selectively increased or decreased;
wherein the angle of inclination of the helically ramped faces to the planar faces is 13 degrees, so that there will be no relative rotational motion between the spacer halves when the expanding spacer is interposed between the nut and the component.

6. A method of tensioning a bolt including the steps of:
applying a nut to the bolt, where the nut extends beyond the shank of the bolt; and
connecting a tensioning apparatus to the nut; so arranged that the nut transfers a tensile load generated by the tensioning apparatus to the bolt, wherein the tension apparatus is screw threadably connected to internal threads of an extended portion of the nut, wherein a quick release connection between the tensioning apparatus and the nut is provided;

wherein an expanding spacer is interposed, about the bolt, between the nut and a component to be clamped, the expanding spacer being axially extendible to take up the strain gap between the nut and the component as the bolt is tensioned by the tensile load; and wherein the expanding spacer has two spacer halves, each with a planar faces and an inclined ramp face and a bore to receive the bolt, the spacer halves being relatively moved laterally, so that the opposed ramp faces of the spacer halves cause the axial distance between the respective planar faces of the spacer halves to be selectively increased or decreased;

wherein the angle of inclination of the ramped faces to the planar faces is selected so that there will be no relative lateral motion between the spacer halves when the expanding spacer is interposed between the nut and the component.

\* \* \* \* \*